March 25, 1941.  J. W. BECK  2,235,914
HOLDER FOR FISHING FLIES AND THE LIKE
Filed July 24, 1940
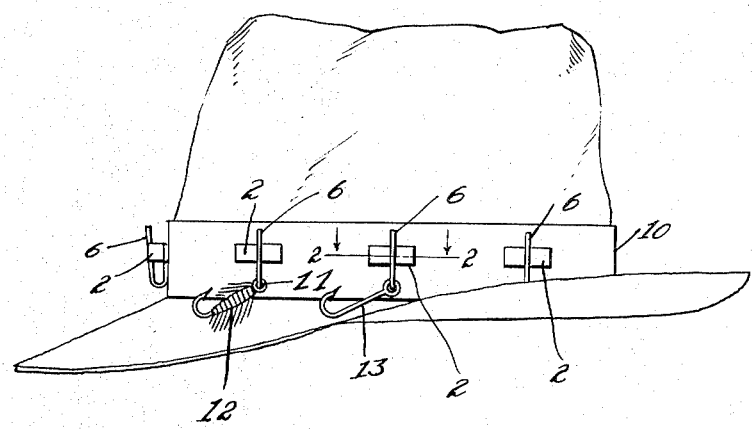
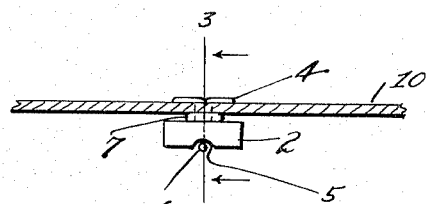
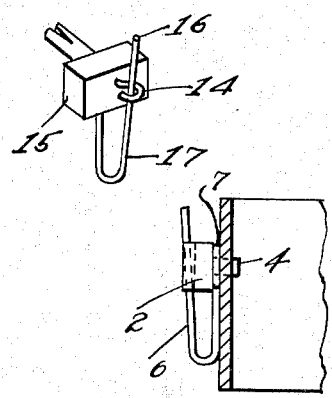
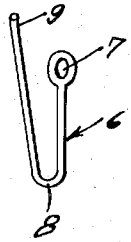
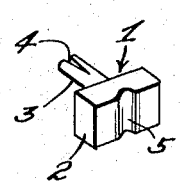
Inventor
John. W. Beck
By Clarence A. O'Brien
Attorney Patented Mar. 25, 1941

2,235,914

UNITED STATES PATENT OFFICE 2,235,914

HOLDER FOR FISHING FLIES AND THE LIKE

John W. Beck, Madill, Okla.

Application July 24, 1940, Serial No. 347,281

4 Claims. (Cl. 43—32)

My invention relates to improvements in holders for carrying fishing flies, spinners, hooks, sinkers, and other fishing adjuncts.

The principal object of the invention is to provide a simply constructed, inexpensive device for attachment to a hat band, to hold fishing flies, or spinners, or similar articles so that the same will not become lost or damaged and which is adapted for quick attachment to the hat band and also for quick attachment of such articles thereto and detachment therefrom.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in side elevation illustrating the preferred form of my invention and the use thereof, Figure 2 is a view in longitudinal section taken on the line 2—2 of Figure 1 and drawn to an enlarged scale, Figure 3 is a view in transverse section taken on the line 3—3 of Figure 2, Figure 4 is a view in perspective of the clip, Figure 5 is a similar view of the body of the fastener, and Figure 6 is a view in perspective of a modified form of the invention.

Referring to the drawing by numerals, the holder of my invention, in its preferred form, comprises a body 1 of rivet-like form having a substantially rectangular head 2 provided with a shank 3 extending laterally and centrally from one side thereof and terminating in a longitudinally split tail end 4. The other, or front, face of the head 2 is provided with a transverse central groove 5 for a purpose presently seen. The shank 3 supports a clip 6 comprising a short length of resilient wire having an eye 7 at one end thereof fitted over the shank 3 behind the head 2, said wire being bent upon itself intermediate its ends to form an open loop 8 adapted to depend from the body 1 and terminating in a free end 9 adapted to overlie the front face of the head 2 and seat in the groove 5, the free end extending well above the head 2.

In the use of the described invention, the shank 3 is extended through a hat band 10 and its split end 4 clinched on the rear side of the band, as best shown in Figure 2, to clamp the clip 6 to the band with a loop 8 depending from the shank 3 and the head 2 clamping the eye to the band. Any desired number of holders may be thus secured to the hat band. By merely hooking the eye 11 of a fishing fly 12, or hook 13, or the like, over the free end of the loop 6 and pulling downwardly and outwardly thereon, the eye 11 may be slid into the loop 8 below the head 2. Upon release of the fly 12, or hook 13, the free end of the loop 6 will snap into the groove 5 and interlock therewith so that the clip cannot turn on the shank 3 and the loop 6 of the clip is closed so that the fly or hook is confined on the clip as will be clear.

In the modified form of the invention shown in Figure 6, a hook 14 is provided on the front face of the head 15 into which the free end 16 of the loop 17 of the clip may be snapped sidewise, said hook together with the clip forming a clasp, as will be clear. Otherwise, the invention in this form thereof is the same as previously described.

The foregoing will, it is believed, suffice to impart a clear understanding of my invention without further explanation.

Manifestly the invention is susceptible of modification in other respects than as disclosed and without departing from the inventive concept, and right is herein reserved to such other modifications as fall within the scope of the subjoined claims.

What I claim is—

1. A holder for fishing flies, hooks, and the like and attachment to a hat band comprising a flat head, a split shank extending from one side of said head for extension through said band and clinching to the rear side of the band, and a resilient clip comprising an open loop depending from said shank and having an end attached to the shank and a free end extending across the opposite side of said head and bearing against the same, said clip being adapted for extension through the eye ends of the fishing flies, hooks or the like.

2. A holder for fishing flies, hooks, and the like and attachment to a hat band comprising a flat head, a split shank extending from one side of said head for extension through said band and clinching to the rear side of the band, and a resilient clip comprising an open loop depending from said shank and having an end attached to the shank and a free end extending across the opposite side of said head and bearing against the same, said clip being adapted for extension through the eye ends of the fishing flies, hooks or the like, said head having a groove in said opposite face thereof for seating the free end of the loop therein to prevent said end from being flexed laterally.

3. A holder for fishing flies, hooks and the like and attachment to a hat band comprising a flat head, a split shank extending from one side of said head for extension through said band and clinching to the rear side of the band, and a resilient clip comprising an open loop depending from said shank and having an end attached to the shank and a free end extending across the opposite side of said head and bearing against the same, said clip being adapted for extension through the eye ends of the fishing flies, hooks or the like, said attached end of the loop comprising an eye fitting over said shank.

4. A holder for fishing flies, hooks, and the like and attachment to a hat band comprising a flat head, a split shank extending from one side of said head and for extension through said band and clinching to the rear side of the band, and a resilient clip comprising an open loop depending from said shank and having an end attached to the shank and a free end extending across the opposite side of said head, said clip being adapted for extension through the eye ends of the fishing flies, hooks, or the like.

JOHN W. BECK.